March 22, 1960 F. W. HOELTJE 2,929,663
BEARING OIL SCAVENGER
Filed May 28, 1957 2 Sheets-Sheet 1

INVENTOR.
Frederick W. Hoeltje
BY
Paul Fitzpatrick
ATTORNEY

March 22, 1960 F. W. HOELTJE 2,929,663
BEARING OIL SCAVENGER
Filed May 28, 1957 2 Sheets-Sheet 2

INVENTOR.
Frederick W. Hoeltje
BY Paul Fitzpatrick
ATTORNEY

United States Patent Office 2,929,663
Patented Mar. 22, 1960

2,929,663

BEARING OIL SCAVENGER

Frederick W. Hoeltje, Indianapolis, Ind., assignor to General Motors Corporation, Detroit, Mich., a corporation of Delaware Application May 28, 1957, Serial No. 660,500

2 Claims. (Cl. 308—187)

This invention concerns generally oil sealing arrangements between relatively rotatable shaft assemblies. It is particularly concerned with the seals for oil circulated by centrifugal action to lubricate bearings between the shafts themselves and the shafts and shaft housings.

By way of example, it is well known that in two-spool engines of the jet type there are mounted for rotation in the engine housing two concentric shafts, both of which may rotate relative to the engine housing and also relative to each other. In such engines there are normally areas adjacent the bearings which, if not properly sealed off from the bearings, will be undesirably contaminated by the oil used to lubricate these bearings. This results in substantial losses of lubricating oil and also may be dangerous if the oil in such areas should become vaporized and then be ignited. It will be appreciated that since the oil is to be distributed radially to lubricate the bearings from an axial location the lubricating oil must pass through the areas between the spaced shafts and between the outer shaft and housing before being returned to a suitable sump. These relatively wide radial areas present severe oil seal problems which heretofore have not been satisfactorily solved.

The present invention has been proposed to obviate the above difficulties by provision of unique composite oil slingers and seals which cooperate with the shafts, housing and bearings to confine the passage of the oil radially in a relatively narrow annular section including a sump from which the oil may be scavenged to be circulated again.

For a more complete understanding of the invention and the objects thereof reference may be had to the accompanying detailed description and the drawings, in which.

Figure 1:
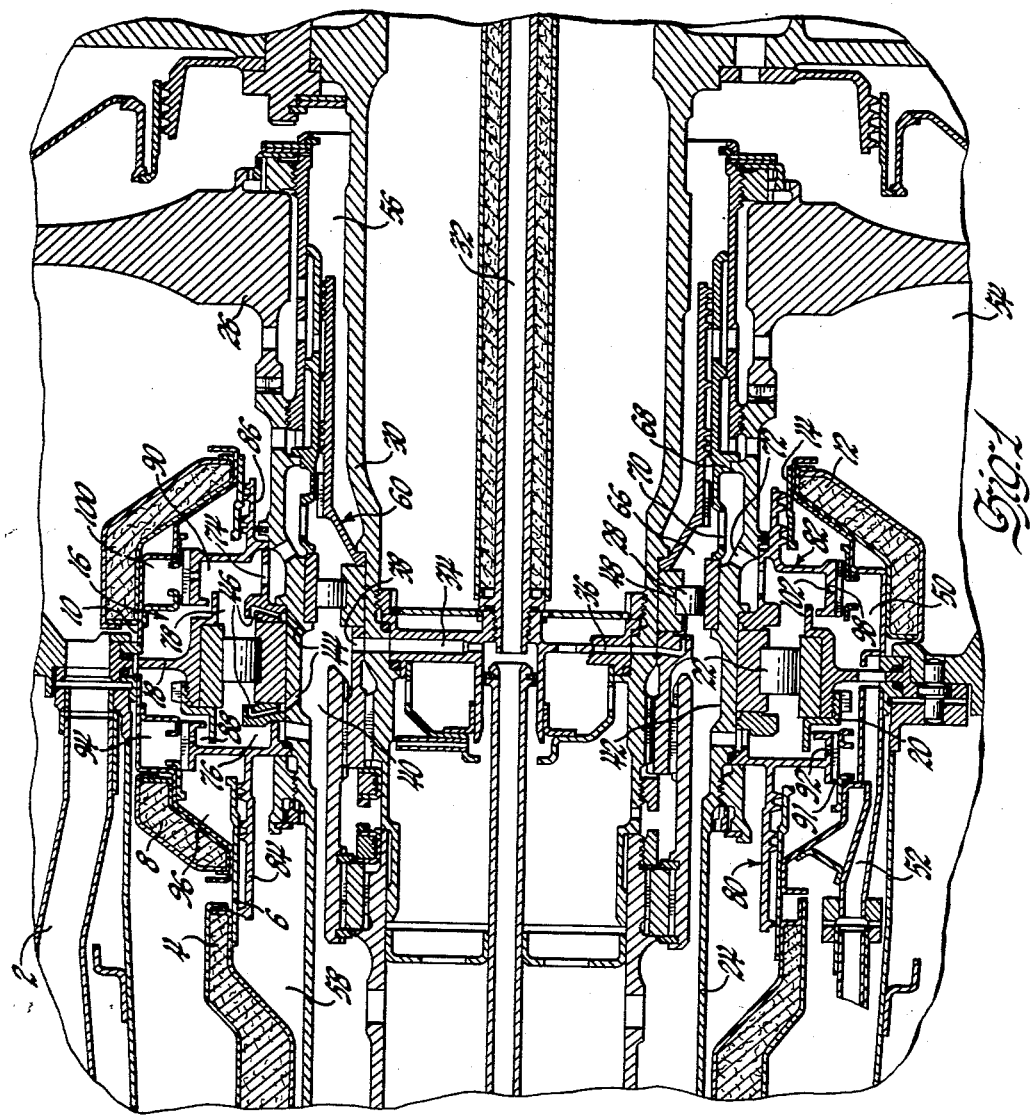
Fig. 1 is a view in elevation of a portion of a two-spool jet engine with parts broken away and in section embodying the invention.

Referring now to the drawings and particularly to Fig. 1, that portion of the engine shown comprises an outer engine housing 2 having formed therein by the walls 4, 6, 8, 10, 12 and 14, respectively, an annular cavity indicated generally by a numeral 16. Secured inside the housing 2 and extending thereabout is a radial bearing support 18 in which is secured by threaded cap 20 a roller bearing set 22. Roller bearing set 22 is conventional and includes the usual inner and outer races and the annularly spaced plurality of roller bearings. Journaled for rotation in bearing set 22 is an outer shaft assembly 24 which at one end thereof has connected thereto a turbine wheel 26. Pressed inside the shaft assembly 24 is a second roller bearing set 28 which, except for the fact that it is smaller, is similar to bearing set 22. Bearing set 28 has journaled for rotation therein and in outer shaft 24 a concentrically located inner shaft assembly 30 which is connected between a forward compressor section and a rearward turbine section, neither of which are shown. Concentrically located within the inner shaft assembly 30 and supported thereby is an axially extending oil conducting conduit 32 which rotates with shaft 30. The conduit 32 is connected to a suitable oil pressure source (not shown) and conducts oil from the pressure source to a series of radial passages 34 and 36, respectively, which, due to rotation of the parts including conduit 32 and passageways 34, 36, will cause the oil to be centrifuged radially outwardly away from the axis of the shaft assemblies 24 and 30. Passageways 34 lead to ports 38 on the outer periphery of shaft assembly 30, which are in communication with an annular area 40 between the inner and outer shaft assemblies. The inner surface of the outer shaft assembly 24 in the area 40 is formed with a trough 42 which collects the oil centrifuged outwardly through the ports 38. Since, however, shaft 24 is also normally turning, the oil collected in trough 42 will be centrifuged through passages 44 in shaft 24 to ports 46 which jet the oil parallel to the shaft axes through the bearing set 22 so as to lubricate the bearing. The oil centrifuged through the passage 36 likewise is jetted axially through a port 48 into the bearing 28 so as to lubricate that bearing.

The oil after lubricating bearings 22 and 28 must be collected and cooled so that it may again be circulated through the bearings. For such purpose a sump 50 is provided in the lower part of the cavity 16 when viewing the drawing, which sump is connected by the conducting means 52 with a scavenging pump (not shown).

Figure 4:
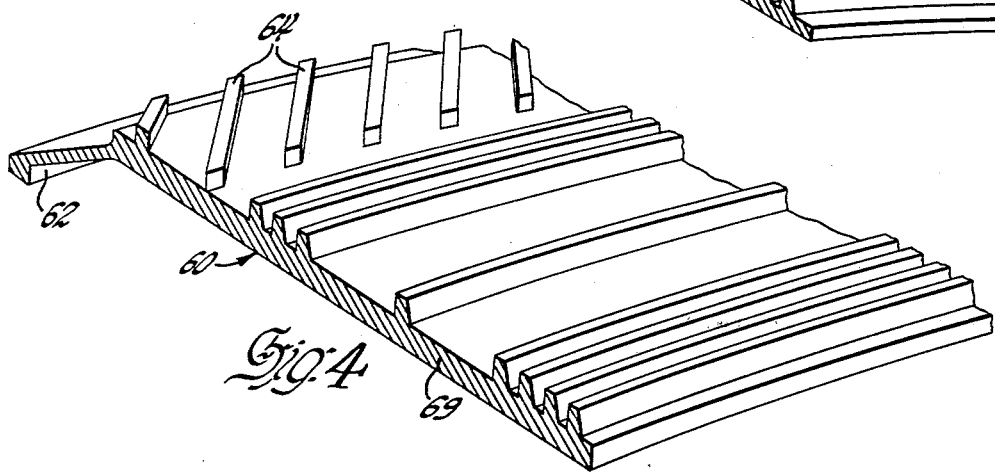
Fig. 4 is a view in perspective of a portion of the unique composite oil slinger and seal located between the inner shaft and the outer shaft.

To prevent the oil used to lubricate bearings 22 and 28 from passing into undesirable locations such as those indicated at 54, 56 and 58 and to assure that the oil once lubrication of bearings 22 and 28 has been completed is collected, the unique composite oil slingers and seals have been provided. The first of such seals is indicated generally by a numeral 60 and is located between the inner and outer shafts 24 and 30 and mounted on shaft 30 and fastened at its one end so that it rotates therewith. This seal and oil slinger 60, the details of which are best observed in Fig. 4, comprises a more or less axially extending conical portion 62 to the right of which, as viewed in the drawings, are a plurality of annularly spaced radially extending diagonally positioned vanes 64 which are substantially located in an annular chamber 66, formed by the seal 60, the bearing 28 and a member 68 forming a part of shaft assembly 24. To the right of the vanes 64, as viewed in Fig. 1, are a series of radial flanges formed on a cylindrical portion 69 of the seal 60 which sealingly engage the member 68 so as to prevent the flow of oil therepast into the area 56 from chamber 66. The vanes 64 are so arranged that any oil from the chamber 66 which tends to flow from chamber 66 past the vanes 64 and the flanges of the seal into the area 56 will be pumped back into the chamber 66 or toward the bearing 28. Since shaft 30 is rotating along with the composite oil slinger and seal 60, the oil in chamber 66 will be centrifuged upwardly through a series of openings 70 in member 68 and through openings 72 and 74 which lead through the outer shaft assembly 24 to its outer periphery or exterior.

Figure 2:
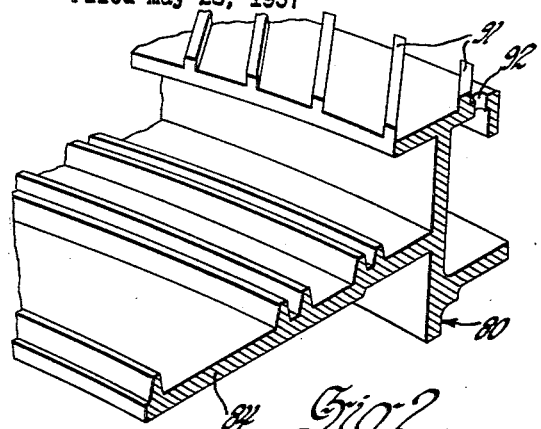
Fig. 2 is an enlarged detail view in perspective of a portion of one of the unique composite seal and oil slingers between the outer shaft and housing of Fig. 1 used to confine the oil into a relatively small annular area and prevent its leaking into areas which would result in the loss of oil and also the danger of the oil vaporizing and upon ignition exploding.
Figure 3:
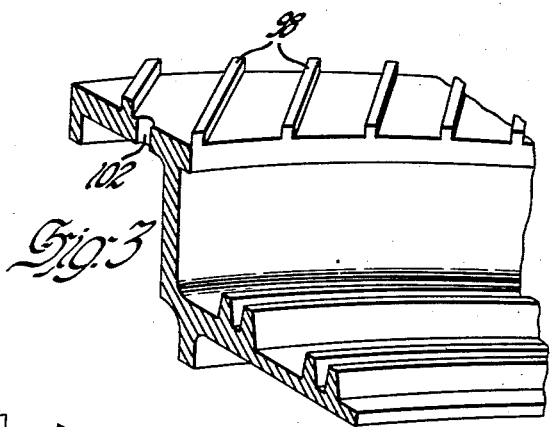
Fig. 3 is another perspective view of a portion of an oil slinger and seal similar to that shown in Fig. 2 except that the vanes on the slinger are arranged to direct the oil in an opposite axial direction.

As previously mentioned, oil is also centrifuged outwardly and jetted through the bearing assembly 22. This oil is confined to the areas 76, 78 on opposite sides of the bearing 22 by a pair of composite oil slinger seals indicated generally by numerals 80 and 82, respectively. Composite slinger and seal 80 (in addition to Fig. 1 see also Fig. 2) is provided with an axially extending cylindrical section 84 having outwardly extending radial sealing flanges sealingly engaging annular member 6 to provide a seal between the housing 2 and area 58 tending to prevent oil from finding its way into the area 58. Seal assembly 82 (see Figs. 1 and 3) is provided with a similar axially extending cylindrical portion 86 which is also provided with radially extending flanges sealingly engaging annular member 14, tending to prevent oil from finding its way from adjacent the bearing 22 past the seal into the area 54. The composite oil slinger and seal assemblies 80 and 82, it will be observed, are mounted for rotation on the shaft assembly 24. It will be noted that seals 80 and 82 each are provided with a radial inwardly facing trough 88 and 90, respectively, to which the oil on either side of the bearing assembly 22 will be centrifuged by reason of the rotating action of the pieces. The oil collected in trough 90 also includes the oil from adjacent the bearing 28 and chamber 66 which has passed through the openings 70, 72 and 74 into the area adjacent bearing 22 to commingle with the oil used to lubricate bearing 22. Seal 82 on its outer periphery radially outboard of the trough 80 is also provided with a plurality of annularly spaced radial diagonal vanes 91. Connecting the area between the vanes and the troughs 88 and 90 are a plurality of annularly spaced ports 92. These ports jet the oil from trough 88 into a trough-like area 94 which leads to the sump 50. If, however, any oil should tend to leak past the vanes 91 into the area 96 and past the seal portion 84, the vanes 91 are arranged so that they will "pump" the oil toward the center of the cavity 16. Seal and oil slinger 82 is similar to seal and oil slinger 80 except that the vanes 98 provided thereon are slanted diagonally in a direction opposite to the vanes 91 so that any oil tending to leak therepast and past the cylindrical portion 86 is again "pumped" toward the center of the bearing cavity 16. A trough-like area 100 similar to 94 collects the oil centrifuged out through the openings 102 between vanes 98 and directs it toward the sump 50.

From the foregoing it may now be appreciated that the oil lubricating and sealing system is effectively centrifuged from the center of the assembly radially outward to provide the stepped bearing assembly with lubrication while confining the oil to a relatively narrow annular area which then leads to the sump where the oil may be scavenged for cooling and recirculating. The seals are arranged so as to prevent the flow of oil therepast and to further positively pump toward the center of the annular area and the bearings any oil which tends to leak past the seals.

I claim:

1. A shaft arrangement comprising, in combination, a housing defining a chamber, a first bearing supported in the chamber, a hollow outer shaft rotatably mounted in the first bearing, a second bearing mounted within the outer shaft, an inner shaft mounted in the second bearing, means for supplying lubricating oil to the bearings, a first labyrinth seal between the outer shaft and the housing, a first oil slinger mounted on and rotatable with the outer shaft between the first bearing and the first seal, a scavenge oil receiver adjacent the first oil slinger within the chamber, a second labyrinth seal between the shafts, and a second oil slinger mounted on and rotatable with the inner shaft between the second bearing and the second seal, the said oil slingers having vanes extending outwardly therefrom and directed helically of the shaft in such direction as to urge oil toward the bearing and radially from the shaft, the outer shaft having an opening for discharge of oil therethrough from the second slinger, the opening communicating with a space between the first bearing and first slinger, and the first slinger having an opening therethrough for discharge of oil from the second bearing through the first slinger into the scavenge oil receiver.

2. A shaft arrangement comprising, in combination, a housing defining a chamber, a first bearing supported in the chamber, a hollow outer shaft rotatably mounted in the first bearing, a second bearing mounted within the outer shaft, an inner shaft mounted in the second bearing, means for supplying lubricating oil to the bearings, a scavenge oil receiver within the chamber, a labyrinth seal between the shafts, an oil slinger mounted on and rotatable with the inner shaft between the second bearing and the seal, the said oil slinger having vanes extending outwardly therefrom and directed helically of the shaft in such direction as to urge oil toward the bearing and radially from the shaft, the outer shaft having an opening for discharge of oil therethrough from the slinger communicating with the scavenge oil receiver.

References Cited in the file of this patent

UNITED STATES PATENTS

| 1,493,598 | Buckwalter | May 13, 1924 |
| 2,804,280 | Wheatley | Aug. 27, 1957 |

FOREIGN PATENTS

| 1,122,005 | France | May 14, 1956 |